(12) United States Patent
Cermelli (10) Patent No.: US 9,481,772 B2
(45) Date of Patent: Nov. 1, 2016

(54) FILM COMPOSITION (71) Applicant: INEOS EUROPE AG, Vaud (CH)

(72) Inventor: Isabelle Cermelli, Sausset les Pins (FR)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/409,003

(22) PCT Filed: Jun. 25, 2013

(86) PCT No.: PCT/EP2013/063202
§ 371 (c)(1),
(2) Date: Dec. 18, 2014

(87) PCT Pub. No.: WO2014/001288
PCT Pub. Date: Jan. 3, 2014

(65) Prior Publication Data
US 2015/0368412 A1  Dec. 24, 2015

(30) Foreign Application Priority Data
Jun. 26, 2012 (EP) .................................. 12173654

(51) Int. Cl.
*C08J 5/18* (2006.01)
*C08L 23/06* (2006.01)

(52) U.S. Cl.
CPC *C08J 5/18* (2013.01); *C08L 23/06* (2013.01); *C08J 2323/06* (2013.01); *C08J 2323/08* (2013.01); *C08J 2323/20* (2013.01)

(58) Field of Classification Search
CPC ..... C08J 5/18; C08J 2323/08; C08J 2323/20
See application file for complete search history.

(56) References Cited

U.S. PATENT DOCUMENTS

2011/0034635 A1* 2/2011 Kapur .................... C08F 10/00
525/240

FOREIGN PATENT DOCUMENTS

| WO | WO 01/40323 A1 | 6/2001 |
| WO | WO 2006/018245 A1 | 2/2006 |
| WO | WO 2006/085051 A1 | 8/2006 |
| WO | WO 2008/074689 A1 | 6/2008 |

* cited by examiner

*Primary Examiner* — Robert Harlan
(74) *Attorney, Agent, or Firm* — Nixon & Vanderhye P.C.

(57) ABSTRACT

Film formed from a polyethylene composition having a density of 948-956 kg/m$^3$, a high load melt index HLMI of 7-15 and a melt storage modulus G' at a dynamic frequency where the loss modulus G"=3000 Pa. G'(G"=3000) of 1400-1800 Pa. The composition has a value of Mz/G'(G"=3000) of at least 900 DA/PA, where Mz is z-average molecular weight.

19 Claims, 2 Drawing Sheets

Fig 1

Relationship between Mz/G' (G" = 3000) and HLMI

Fig 2

Elmendorf tear strength TD as a function of dart drop impact I for 15 μm film obtained under various processing condition

FILM COMPOSITION

This application is the U.S. national phase of International Application No. PCT/EP2013/063202 filed Jun. 25, 2013 which designated the U.S. and claims priority to European Patent Application No. 12173654.0 filed Jun. 26, 2012, the entire contents of each of which are hereby incorporated by reference.

The present invention relates to novel ethylene polymer compositions and to films made therefrom.

BACKGROUND OF THE INVENTION

Key properties of films include tear strength and impact resistance, and it is well known that these two parameters generally have an inverse correlation, such that an improvement in one of them is accompanied by a deterioration in the other. Another key property is the processability of the composition from which the films are made, specifically in terms of extrudability and bubble stability.

It is known to make films from bimodal polyethylene compositions, that is to say compositions comprising a low molecular weight (LMW) component and a high molecular weight (HMW) component. The presence of a lower molecular weight fraction can improve the extrudability of the resin, whereas the presence of a higher molecular weight fraction ensures good mechanical properties and melt strength. However films made from bimodal resins may have an inferior appearance due to the presence of gels, which is indicative for a lower degree of homogeneity of the final resin.

Our own WO 2006/018245 discloses polyethylene film compositions having a particular relationship between melt storage modulus G', measured in Pa and at a dynamic frequency where the loss modulus G"=3000 Pa, and dynamic complex viscosity $\eta^*_{100}$, measured in Pa·s at 100 rad/s. Storage modulus G' (at a loss modulus G" of 3000 Pa), also referred as G'(G"=3000), which is linked to the long chain branching content and the breadth of the molecular weight distribution of the resin, affects the melt elasticity and melt strength of a molten resin during blown film extrusion; a higher G' corresponds to a higher melt strength. This is desirable for film blowing, as a high melt strength gives improved bubble stability. However if G' is too high mechanical properties can be adversely affected. No minimum G' is specified in WO 2006/018245, but the lowest exemplified is 1810 Pa. Impact and tear strength are given for some of the Examples in WO 2006/018245, but there is no disclosure relating to a specific relationship between the two.

EP 1712574A discloses a polyethylene resin for films said to have improved processability and mechanical properties, particularly impact strength. Although the resin is simply stated to have a density of 940 kg/m³ or more, the Examples all have densities in the range 945-947 kg/m³, as it is well known that dart drop impact resistance declines sharply with increasing density (see for example Ster van der Ven, "Polypropylene and other Polyolefins", Elsevier Science Publishers, 1990, p. 489). However, the low density exemplified in EP 1712574A would also be expected to result in lower barrier and tensile properties as a result of the lower crystallinity at decreased density (A J Peacock, Polyethylene Handbook 2000, page 132, 190).

SUMMARY OF THE INVENTION

We have now found a range of polymer compositions which is capable of making films with an improved balance of mechanical properties, particularly tear strength and impact resistance in combination with excellent extrudability, melt strength, tensile and barrier properties.

In its first aspect, the present invention provides a film formed from a polyethylene composition having a density of 948-956 kg/m³, a high load melt index HLMI of 7-15, a melt storage modulus G' at a dynamic frequency where the loss modulus G"=3000 Pa, G'(G"=3000) of 1400-1800 Pa, and a value of Mz/G'(G"=3000) of at least 900 Da/Pa, where Mz is z-average molecular weight. Preferably the film has a relationship between transverse direction tear strength of a 15 μm film ($T_{TD}$, expressed in g/25 μm)) and dart drop impact resistance of a 15 μm film (I, expressed in g) represented by $T_{TD}>62000/I$.

The inventors have found that within a given range for G' (G"=3000), the ratio Mz/[G'(G"=3000)] is a good measure of the suitability of a polyethylene composition for film applications, and in particular its suitability for producing thin films with good mechanical properties. In particular a high Mz value, leading to a large Mz/G'(G"=3000) ratio, is desirable to achieve a good balance of tear strength and impact resistance, at the same time as providing a composition which has good properties for use in the film blowing process in terms of extrudability and melt strength as well as yield strength. Without wishing to be bound by theory, it is believed that at a given G' value, a high Mz value and the consequent large Mz/G'(G"=3000) ratio is indicative of the formation of a larger number of tie molecules during the crystallisation process, which is responsible for the good balance of tear strength and impact resistance. The measurement of Mz, G' and G" is described below in connection with the Examples.

In a further aspect the present invention provides a film formed from a polyethylene composition having a density of 948-956 kg/m³, an HLMI of 7-15 and a melt storage modulus G' at a dynamic frequency where the loss modulus G"=3000 Pa, G'(G"=3000) of 1400-1800 Pa, said film having a relationship between transverse direction tear strength of a 15 μm film ($T_{TD}$, expressed in g/25 μm) and dart drop impact resistance of a 15 μm film (I, expressed in g) represented by $T_{TD}>62000/I$. Preferably the film has a value of Mz/G'(G"=3000) of at least 900 Da/Pa, where Mz is z-average molecular weight.

Impact strength characterises the behaviour of a material under a specific load (impact). The dart drop test applies specifically to films: a free-falling dart of specific weight and geometry is dropped onto a film from a specified height. All dart drop values are measured according to ASTM D1709 Method A, and all values quoted herein are on a 15 μm film.

For the avoidance of doubt, all film properties disclosed and claimed herein are measured on films which have been blown while being cooled externally by a stream of air having a temperature between 15 and 25° C.

Tear strength characterises the resistance to tearing of a film in a particular direction, either machine direction (MD—the direction of stretching) or transverse direction TD. Elmendorf Tear Resistance is the resistance to tearing measured according to ASTM Standard D 1922 on 15 μm film and is expressed in g/25 μm. The compositions of the present invention have been found to have particularly good TD tear strength for a given impact strength as measured by the dart drop test.

All preferred features described below relate to both aspects of the invention.

The polyethylene composition from which the film is made preferably has a melt storage modulus G'(G"=3000) of from 1450 to 1750, most preferably from 1500 to 1700.

The HLMI of the polyethylene composition from which the film is made is preferably from 8 to 14, and most preferably from 8 to 13.

The melt flow index $MI_5$ of the polyethylene composition from which the film is made is preferably between 0.2 g/10 min and 0.5 g/10 min, more preferably between 0.25 and 0.45 g/10 min and most preferably between 0.25 and 0.4 g/10 min.

The ratio of HLMI to melt flow index $Mi_5$ ($HLMI/MI_5$) of the polyethylene composition from which the film is made is preferably between 27 and 37, more preferably between 28 and 34.

For the purposes of the present invention, melt flow indices HLMI and $MI_5$ are measured according to ISO1133 at a temperature of 190° C. under loads of 21.6 kg and 5 kg respectively.

The molecular weight distribution Mw/Mn of the polyethylene composition from which the film is made, as measured by gel permeation chromatography, is preferably between 28 and 38, more preferably between 30 and 36.

The polyethylene composition from which the film is made preferably has a Mz/G'(G"=3000 Pa) of at least 920 Da/Pa, most preferably at least 930 Da/Pa.

Another requirement of polyethylene compositions used to make films is good extrudability, which can be represented by the dynamic complex viscosity. The magnitude of the dynamic complex viscosity at an applied oscillating frequency ω of 100 rad/s, $\eta^*_{100}$, which is linked to the molecular weight of the polymer, is the viscosity at shear rates of the order typically experienced during extrusion processes. It affects extruder motor power consumption, melt pressure generation at the die etc; a low $\eta^*_{100}$ is desirable. The composition used in the invention preferably has a dynamic complex viscosity $\eta^*_{100}$ below 2400 Pa·s, more preferably below 2300 Pa·s.

The polyethylene composition preferably has a density of from 949 to 955 kg/m³ and most particularly from 950 to 953 kg/m³.

In one preferred embodiment the polyethylene composition has a density between 950 to 953 kg/m³ and an HLMI between 8 and 13 g/10 min.

In one preferred embodiment, the polyethylene composition from which the film is made is a multimodal polyethylene composition comprising from 40 to 60 wt % of an ethylene polymer (A) having a density of at least 965 kg/m³, and from 60 to 40 wt % of an ethylene polymer (B) having a density of 910 to 945 kg/m³.

The polyethylene composition may optionally further comprise a small prepolymerisation fraction in an amount of 10 wt % or less based on total polyethylene. Alternatively or additionally it may further comprise a fraction of very high molecular weight polymer, having a higher molecular weight than the aforementioned high molecular weight polymer, in an amount of 10 wt % or less based on total polyethylene.

It is generally preferred that the weight ratio of polymer (A) to polymer (B) in the polyethylene composition is between 47:53 and 55:45, more preferably between 48:52 and 53:47, regardless of the presence or otherwise of any additional polyethylene fractions.

The polyethylene composition of the invention is multimodal, in that it comprises at least two polyethylene components. Preferably it is bimodal, which means that it contains significant amounts of only two polyethylene components. The form of the molecular weight distribution curve, i.e. the appearance of the graph of the polymer weight fraction as function of its molecular weight, of a multimodal polyethylene will show two or more maxima or at least be distinctly broadened in comparison with the curves for the individual fractions. For example, if a polymer is produced in a sequential multistage process utilising reactors coupled in series with different conditions in each reactor, each of the polymer fractions produced in the different reactors will have its own molecular weight distribution and weight average molecular weight. The molecular weight distribution curve of such a polymer comprises the sum of the individual curves of the fractions, typically yielding a curve for the multimodal polymer having a substantially single peak or two or more distinct maxima. A "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in a molecular weight distribution curve into two or more components by various methods.

It is particularly preferred that ethylene polymer (A) is a homopolymer, and the ethylene polymer (B) is a copolymer of ethylene and a $C_4$-$C_8$ alpha-olefin.

The amount of polymer (A) present in the composition is preferably between 47 wt % and 55 wt % based on total polyethylene, more preferably between 48 wt % and 53 wt %. The amount of polymer (B) present in the composition is preferably between 45 wt % and 53 wt %, more preferably between 47 wt % and 52 wt %. These amounts correspond to the weight ratio of (A) to (B) in the case where these are the only two polyethylene fractions present in the composition. However as previously described, other polyethylene fractions may optionally be present in the composition: when the amounts of polymer (A) and polymer (B) are 47-55 wt % and 45-53 wt % respectively, it is preferred that the maximum amount of any prepolymer as previously described is 5 wt %, and the maximum amount of any very high molecular weight fraction as previously described is 5 wt %.

For the purposes of the present invention, the term "homopolymer" is understood to denote an ethylene polymer composed essentially of monomer units derived from ethylene and substantially devoid of monomer units derived from other olefins. It may contain trace amount of units derived from other olefins which are present as impurities in the feed or recycle streams of the polymerisation process or which are carried over between stages in a multistage process, but it should contain less than 0.3 mol %, preferably less than 0.2 mol % of units derived from other olefins. The term "copolymer of ethylene and a $C_4$-$C_8$ alpha-olefin" is understood to denote a copolymer comprising monomer units derived from ethylene and monomer units derived from a $C_4$-$C_8$ alpha-olefin and, optionally, from at least one other .alpha.-olefin. The $C_4$-$C_8$ alpha-olefin can be selected from olefinically unsaturated monomers comprising from 4 to 8 carbon atoms, such as, for example, 1-butene, 1-pentene, 1-hexene, 3-methyl-1-butene, 3- and 4-methyl-1-pentenes and 1-octene. Preferred alpha-olefins are 1-butene, 1-hexene and 1-octene and more particularly 1-hexene. The other alpha-olefin which may also be present additional to the $C_4$-$C_8$ alpha-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in copolymer (B) of monomer units derived from $C_4$-$C_8$ alpha-olefin, hereinafter called comonomer content, is generally at least 1 wt %, in particular at least 1.5 wt %. The comonomer content of copolymer (B) is usually at most 6 wt %, preferably at most 5 wt %. Comonomer content in the overall composition is preferably in the range 0.5-3 wt %.

For the purposes of the present invention, the $C_4$-$C_8$ alpha-olefin content is measured by $^{13}C$ NMR according to the method described in J. C. Randall, JMS-Rev. Macromol. Chem. Phys., C29(2&3), p. 201-317 (1989), that is to say that the content of units derived from $C_4$-$C_8$ alpha-olefin is calculated from the measurements of the integrals of the lines characteristic of that particular $C_4$-$C_8$ alpha-olefin in comparison with the integral of the line characteristic of the units derived from ethylene (30 ppm). A composition composed essentially of monomer units derived from ethylene and a single $C_4$-$C_8$ alpha-olefin is particularly preferred.

In the preferred aspect of the invention, polymer (A) has an $MI_2$ of from 100 to 800, preferably from 200 to 700, The most preferred range of $MI_2$ for polymer (A) is from 250 to 450 g/10 min. For the purposes of the present invention, melt flow index $MI_2$ is defined as that measured according to ISO1133 at a temperature of 190° C. under a load of 2.16 kg, although in the Examples below it has been calculated from the value measured using a smaller 8 mm length/1.0 mm internal diameter die.

The density of polymer (A) is preferably between 968 and 975 kg/m³, more preferably between 970 and 974 kg/m³.

The density of copolymer (B) is preferably between 920 and 940 kg/m³, more preferably between 925 and 935 kg/m³.

The ratio of HLMI to melt index $MI_2$ for polymer (A) is preferably 20 to 40, more preferably 25 to 35.

The ratio of HLMI to melt index $MI_5$ for polymer (A) is preferably 5 to 15, more preferably 8 to 13.

The ratio of HLMI to melt index $MI_2$ for polymer (B) is preferably 20 to 40, more preferably 25 to 35.

The ratio of HLMI to melt index $MI_5$ for polymer (B) is preferably 5 to 15, more preferably 8 to 13.

If polymers (A) and (B) are made separately and then blended, it is possible to measure directly the melt index, density and comonomer content of both polymers. However, if the multimodal polymer is made in a multistage process in which one polymer is made prior to the other and then the second polymer is made in the presence of the first polymer, then the melt index, density and comonomer content of the second polymer cannot be measured, and instead for the purposes of this invention they are defined as shown below. The definitions below would also apply to a third or subsequent polymer (if one is present) which is made in the presence of the first two polymers.

All melt indices such as HLMI and $MI_2$ of the second (or third or subsequent) polymer are defined as being the value directly measured for the second (or third or subsequent) polymer when made separately under the same polymerisation conditions as used to make the multimodal composition. In other words, the second (or third or subsequent) polymer is made separately using the same catalyst and under the same polymerisation conditions as those employed in the second (or third or subsequent) reactor of the multimodal polymerisation, and its melt index is then measured.

The density of the second (or third or subsequent) polymer is defined as being that calculated from the relationship:

$$\text{density (composition)} = \sum_{1}^{n} x_n \cdot d_n$$

where x is the weight fraction of component n, d is the density of component n, and n is the number of polymers in the composition.

The comonomer content of the second (or third or subsequent) polymer is defined as being that calculated from the relationship:

$$\text{comonomer content (composition)} = \sum_{1}^{n} x_n \cdot c_n$$

where x is the weight fraction of component n, c is the comonomer content of component n, and n is the number of polymers in the composition.

If the polymer is made with a "multiple catalyst system" such as a bimetallic catalyst, it is possible to make both polymers (A) and (B) in the same reactor. In such a case it is not possible to measure directly the properties of either polymer (A) or polymer (B). Therefore in this case the properties of both polymers (A) and (B) are defined as being those obtained when the respective polymers are prepared separately using the individual catalysts of the "multiple catalyst system", and under the same polymerisation conditions as those employed for making the multimodal polymer composition.

A particularly preferred composition for forming the films of the present invention has a density between 949 to 955 kg/m³ and an HLMI between 8 and 14 g/10 min, and comprises from 47 to 55 wt % of an ethylene polymer (A) having a density of between 968 and 975 kg/m³, and from 45 to 53 wt % of an ethylene polymer (B) having a density of between 920 and 940 kg/m³, the ratio of (A):(B) also being from 47:53 to 55:45. Polymer (A) preferably has an $MI_2$ between 200 and 700 g/10 min.

The most preferred multimodal composition for forming the films of the present invention has a density between 950 to 953 kg/m³ and an HLMI between 8 and 13 g/10 min, and comprises from 48 to 53 wt % of an ethylene polymer (A) having a density of between 970 and 974 kg/m³, and from 47 to 52 wt % of an ethylene polymer (B) having a density of between 925 and 935 kg/m³, the ratio of (A):(B) also being from 48:52 to 53:47. Polymer (A) preferably has an $MI_2$ between 250 and 450 g/10 min.

Whilst the films of the invention may consist entirely of the polyethylene composition described above, the invention includes within its scope films comprising other components in addition to the polyethylene composition. In particular, the film may contain conventional additives in an amount of up to 8 wt %, preferably up to 5 wt % and more preferably up to 3 wt % based on the total weight of the film. Such additives include stabilizers (antioxidizing agents and/or anti-UV agents), antistatic agents and processing aids, as well as pigments. The film may also contain up to 10 wt % of another polyolefin. However all compositions of the invention comprise a minimum of 47 wt % of polymer (A) and 45 wt % of polymer (B), and therefore the maximum combined amount of all other components including any prepolymer, very high molecular weight polymer, additives or other polyolefin (if present), is 8 wt %. Similarly, when the minimum amount of polymer (A) is 48 wt % and the minimum amount of polymer (B) is 47 wt %, the maximum content of all other components is 5 wt %, In a preferred embodiment, the films of the invention have a dart drop value of more than 270 g, more preferably more than 310 g, and still more preferably more than 350 g, when the film has a thickness of 15 µm and is extruded with a die diameter of 100 mm, a die gap of 1.2 mm, a blow-up ratio BUR of 4, a neck height of 7× die diameter and a take-up speed of 30 m/min.

It is preferred that the films of the invention have an Elmendorf tear strength in the transverse direction (TD) of at least 150 g/25 μm, more preferably at least 170 g/25 μm and most preferably at least 190 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

It is preferred that the films of the invention have an Elmendorf tear strength in the machine direction (MD) of at least 18 g/25 μm more preferably at least 20 g/25 μm and most preferably at least 21 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

The compositions used in the films of the invention are preferably unreticulated.

The preferred polyethylene composition used in the films of the invention may be produced by any of the methods known in the art, such as mechanically blending polymers (A) and (B) and optionally other polyethylenes, in situ formation of of polymers (A) and (B) in the presence of a "multiple catalyst system", and formation of polymers (A) and (B) in a multistage process. Blending may be carried out in any conventional blending apparatus.

By a "multiple catalyst system" is meant a composition, mixture or system including at least two different catalyst compounds, each having the same or a different metal group, including a "dual catalyst," e.g., a bimetallic catalyst. Use of a multiple catalyst system enables a multimodal product to be made in a single reactor. Each different catalyst compound of the multiple catalyst system may reside on a single support particle, in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerisation is conducted in the presence of the bimetallic catalyst system, i.e., the two collections of supported catalysts. Alternatively, the multiple catalyst system includes a mixture of unsupported catalysts in slurry form. One catalyst may be used to produce the HMW component, and the other may be used to produce the LMW component. The catalyst producing the LMW component is usually more responsive to chain termination reagents, such as hydrogen, than the HMW catalyst.

However the polyethylene composition of the invention is preferably obtained by a multistage ethylene polymerisation, typically using a series of reactors. A multistage process is a polymerisation process in which a polymer comprising two or more fractions is produced by producing at least two polymer fraction(s) in separate reaction stages, usually with different reaction conditions in each stage, in the presence of the reaction product of the previous stage. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc.

It is preferred that the polymer (A) is produced in the first reactor, and that polymer (B) is produced in a subsequent reactor. However this order may be reversed. If the multimodal composition includes a prepolymer, this is made in a reactor preceding the first reactor. It is preferred that all reactors are slurry reactors, in particular slurry loop reactors.

In a particularly preferred multistage polymerisation process:

in a first reactor, ethylene is polymerized in slurry in a first mixture comprising a diluent, hydrogen, a catalyst based on a transition metal and a cocatalyst, so as to form from 47 to 55% by weight with respect to the total weight of the composition of an ethylene homopolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha.-olefin, are introduced into a subsequent reactor and the slurry polymerization is carried out therein in order to form from 45 to 53% by weight, with respect to the total weight of the composition, of a copolymer of ethylene and of $C_4$-$C_8$ alpha-olefin.

The invention also provides a process for obtaining a polyethylene film, comprising the steps of polymerising ethylene and optionally comonomer, compounding the polyethylene composition to form it into pellets, and then forming the pellets into a film. The step of polymerising ethylene preferably forms a multimodal polyethylene.

The catalyst employed in the polymerisation process to produce the polyethylene compositions of the invention may be any catalyst(s) suitable for preparing such polyethylenes. If the polyethylene is multimodal, it is preferred that the same catalyst produces both the high and low molecular weight fractions. For example, the catalyst may be a chromium catalyst, a Ziegler-Natta catalyst, or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilised. Good results have been obtained with catalysts comprising:

from 5 to 30%, preferably from 6 to 23%, most preferably 8 to 16% by weight of transition metal, from 0.5 to 20%, preferably from 2 to 18%, most preferably 5 to 15% by weight of magnesium, from 20 to 70%, preferably from 30 to 65%, most preferably 40 to 60% by weight of halogen, such as chlorine, from 0.1 to 10%, preferably from 0.2 to 8%, most preferably 0.5 to 5% by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in patents U.S. Pat. No. 3,901,863, U.S. Pat. No. 4,294,2200 and U.S. Pat. No. 4,617,360. The catalyst is preferably introduced only into the first polymerisation reactor, i.e. there is no introduction of fresh catalyst into the further polymerisation reactor. The amount of catalyst introduced into the first reactor is generally adjusted so as to obtain an amount of at least 0.5 mg of transition metal per liter of diluent. The amount of catalyst usually does not exceed 100 mg of transition metal per liter of diluent.

Particularly preferred catalysts contain 5 to 30% by weight of transition metal, 0.5 to 20% by weight of magnesium, 20 to 70% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They may optionally further comprise an electron donor. They are described in more detail in our own EP 703247B. Most preferred catalysts have the following composition:

Transition metal from 8 to 16% by weight.
Magnesium content from 5 to 15% by weight.
Chlorine content from 40 to 60% by weight.
Aluminium content less than 5% by weight.
Residual organic content less than 35% by weight.
Total alkyl benzoate content less than 20% by weight.

The cocatalyst utilised in the process is preferably an organoaluminium compound. Unhalogenated organoaluminium compounds of formula $AlR_3$ in which R represents an alkyl grouping having from 1 to 8 carbon atoms are preferred. Particularly preferred are triethylaluminium and triisobutylaluminium.

In the particularly preferred multistage polymerisation process described above for producing the composition of the invention it is preferred to utilise a Ziegler-Natta catalyst. In such a case the polymerisation temperature is generally from 20 to 130° C., preferably from 60° C. to 115° C., and more preferably from 75° C. to 110° C. The total pressure at which the process is effected is in general from 0.1 MPa to 10 MPa. In the first polymerisation reactor, the total pressure is preferably at least 2.5 MPa. Preferably, it does not exceed 5 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this particularly preferred process, a slurry comprising the resin of the invention is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

Typically the compositions of the invention are compounded into pellets, which may optionally then be used in the manufacture of films. Compounding conditions and equipment are well known to those skilled in the art. Films may optionally be made from compositions which have been reticulated during compounding: however it is preferred that the compositions of the invention and films made therefrom, as well as the films of the invention, are unreticulated.

The compositions made according to the invention can be mixed with the usual processing additives for polyolefins, such as stabilizers (antioxidizing agents and/or anti-UV agents), antistatic agents and processing aids, as well as pigments.

BRIEF DESCRIPTION OF THE DRAWINGS

The invention is further described with reference to the accompanying drawings, in which.

Figure 1:
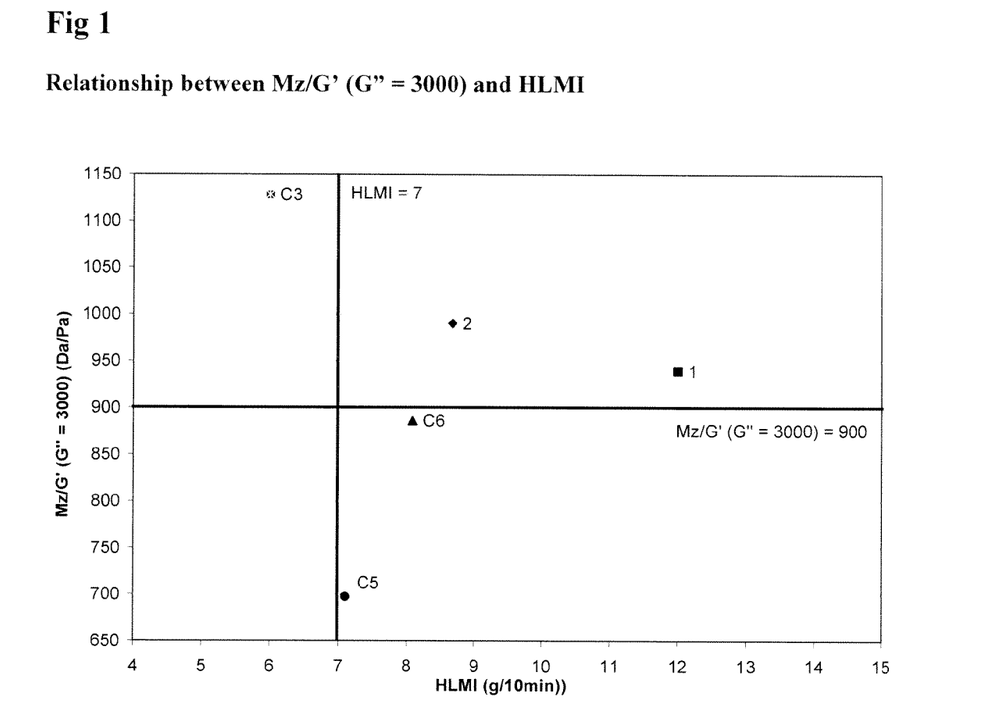
FIG. 1 shows the relationship between Mz/G' (G"=3000 Pa) and HUM.
Figure 2:
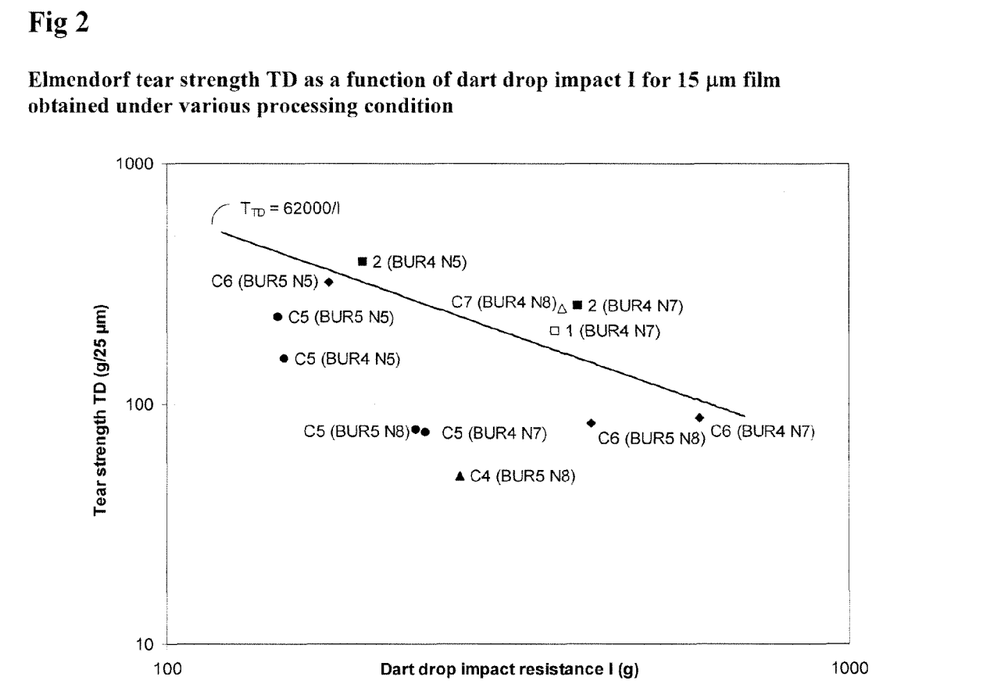
FIG. 2 shows the relationship of the Examples to the equations relating I and T.

The Examples which follow are intended to illustrate the invention, together with FIGS. 1 and 2 of the drawings. FIG. 2 shows the relationship of the Examples to the equations relating I and $T_{TD}$ as specified in one aspect of the invention.

EXAMPLES

The meanings of the symbols used in these examples and the units expressing the properties mentioned and the methods for measuring these properties are explained below.

Melt Indexes

Melt indexes are determined according to ISO1133 and are indicated in g/10 min. For polyethylenes a temperature of 190° C. is applied. $MI_2$ is determined under a load of 2.16 kg, $MI_5$ is determined under a load of 5 kg and HLMI is determined under a load of 21.6 kg.

Density

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Dynamic Rheological Analysis

Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G'(G"=3000)

The frequency sweep (FS) experiment was then carried out at 190° C. using the above appropriately selected strain level between dynamic frequencies range of $10^{-2}$ to 100 rad/s, under nitrogen. The dynamic rheological data thus measured were then analysed using the rheometer software (viz., Rheometrics RHIOS V4.4 or Orchestrator Software) to determine the melt elastic modulus G'(G"=3000) at a reference melt viscous modulus (G") value of G"=3000 Pa. If necessary, the values were obtained by interpolation between the available data points using the Rheometrics software.

The term "Storage modulus", G'(ω), also known as "elastic modulus", which is a function of the applied oscillating frequency, ω, is defined as the stress in phase with the strain in a sinusoidal deformation divided by the strain; while the term "Viscous modulus", G"(ω), also known as "loss modulus", which is also a function of the applied oscillating frequency, ω, is defined as the stress 90 degrees out of phase with the strain divided by the strain. Both these moduli, and the others linear viscoelastic, dynamic rheological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

Elmendorf Tear Resistance

Elmendorf Tear Resistance is the resistance to tearing measured according to ASTM Standard D 1922; MD denotes the measurement in the longitudinal (machine) direction of the film, TD denotes the measurement in the transverse direction of the film. The values have been expressed in g/25 m.

Impact Resistance

DDT=Dart Drop Test, impact strength measured on 15 μm thick films according to ASTM D1709 Method A. The values have been expressed in g.

Gel Permeation Chromatography Analysis for Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 columns WATERS STYRAGEL HMW 6E of 30 cm length and 1 guard column Waters Styragel 4.6×30 mm and a differential refractometer detector.

The solvent used was 1,2,4 Trichlorobenzene at 150° C., stabilised with BHT, of 0.2 g/liter concentration. Polymer solutions of 0.8 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters:
kPS=1.21 10-4 dl g-1αPS=0.707, kPE=3.92.10-4 dl g-1, αPE=0.725.

The calibration curve Mw Pp=f(V) was then fitted with a first order linear equation. All the calculations are done with Empower 2 software from Waters.

A) Catalyst

Magnesium diethoxide was reacted with titanium tetrabutoxide for 7 hours at 140±5° C. in an amount such that the molar ratio of titanium to magnesium was equal to 1. The reaction product thus obtained (mixed alcoholate) was subsequently contacted with ethylbenzoate (EB) at ambient temperature for at least 6 hours and diluted in hexane to reach a concentration of 0.4 mol magnesium per liter, the addition being in an amount such that the molar ratio of ethyl benzoate to magnesium diethoxide was equal to 2. The mixture of mixed alcoholate and ethyl benzoate was then reacted with aluminium isobutyl dichloride (IBADIC), in two steps. Both steps were performed at 45° C. The amount of IBADIC introduced at the end of the first step corresponded to a IBADIC/Mg ratio of 4.5 mole/mole. A partial elimination of the chlorination by-products was effected by decantation of the solid and removal of the supernatant liquid. The amount of IBADIC introduced at the end of the second chlorination step corresponded to a IBADIC/Mg ratio of 2.5 mole/mole. After the second chlorination step, the slurry was aged at 60° C. for 45 minutes, and subsequently cooled at ambient temperature (less than 35° C.). The reaction by-products were then removed from the slurry by washing the solid with polymerisation grade hexane. The catalyst thus obtained, collected from the suspension, comprised (% by weight):
Ti: 13; Cl: 51; Al: 2; Mg: 7. The concentration of total benzoates in the catalyst was about 10 wt %.

B) Composition

The manufacture of a composition comprising ethylene polymers was carried out in suspension in isobutane in two loop reactors with 200 L and 300 L volumes respectively, connected in series and separated by a device which makes it possible continuously to carry out the reduction in pressure.

Isobutane, ethylene, hydrogen, triethylaluminium the catalysts were continuously introduced into the first loop reactor and the polymerization of ethylene was carried out in this mixture in order to form the homopolymer (A). This mixture, additionally comprising the homopolymer (A), was continuously withdrawn from the said reactor and was subjected to a reduction in pressure (~50° C., 0.6 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the ethylene/1-hexene copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

The polymer powder was then transferred to a Werner and Pfleiderer ZSK40 twin-screw extruder and compounded with the following additive package: 1000 ppm calcium stearate, 1000 ppm zinc stearate, 800 ppm Irgafos 168, 800 ppm Irganox 1076.

The other polymerisation conditions are specified in Table 1. The properties of the compositions are presented in Table 2. Comparative examples C3 and C4 are taken from WO 2006/018245 (comparative example A and example 7, respectively) and C7 is taken from EP 1712574A (example 5). Comparative examples C5 and C6 are commercially available resins (Hostalen GM9450F from LyondellBasell Industries and Thaizex 7000F from Bangkok Polyethylene PLC, respectively).

TABLE 1 polymerisation conditions

| | EXAMPLE | |
|---|---|---|
| | 1 | 2 |
| Reactor 1 | | |
| C2 (g/kg) | 14.7 | 14.9 |
| H2/C2 (mole/mole) | 0.82 | 0.72 |
| T (° C.) | 90 | 90 |
| Residence time (h) | 1.54 | 1.60 |
| Reactor 2 | | |
| C2 (g/kg) | 17.9 | 9 |
| C6/C2 (mole/mole) | 0.47 | 1.58 |
| H2/C2 (mole/mole) | 0.005 | 0.002 |
| T (° C.) | 80 | 80 |
| Residence time (h) | 1.30 | 1.32 |

C) Film

The compositions of the above Examples were blown into films on a Kiefel Rotex 40SA line of the following description:
Extruder:
  Manufacturer: KIEFEL Extrusion GmbH, Germany
  Type: Rotex 40SA
  Power: 25 kW
Screw:
  Manufacturer: KIEFEL Extrusion GmbH, Germany
  Type: 24 D Standard
  Diameter (D): 40 mm
  Length (L) to diameter (D): 24/1
  Speed:
    Maximum=275 min$^{-1}$
    Standard=100 min$^{-1}$
    Output at Standard speed=32 kg h$^{-1}$.
Die:
  Manufacturer: KIEFEL Extrusion GmbH, Germany
  Diameter: 100 mm
  Gap: 1.2 mm
The extrusion conditions were as follows:
Extruder Temperatures Profile (° C.):
  Screw Zone 1: 190°
    Zone 2: 200°
  Die Zone 3: 200°
    Zone 4: 200°
    Zone 5: 210°
  Screen Pack: HD type.
Output:
  Screw Speed: 100-110 rpm
  Output: 32 kg h$^{-1}$
External air cooling:
  Temperature: 15-25° C.

TABLE 2 polymer properties

| EXAMPLE | 1 | 2 | C3 | C4 | C5 | C6 | C7 |
|---|---|---|---|---|---|---|---|
| Properties polymer fraction A | | | | | | | |
| wt % A | 50 | 50 | 45 | 45 | | | |
| MI2'(A)(g/10 min) | 23.6 | 25.3 | 11.9 | 11.5 | | | |
| MI2(A) (g/10 min) * | 378 | 405 | 190 | 184 | | | |
| Density A (kg/m³) | 973.5 | 971 | 971 | 971 | | | |
| Properties polymer composition (after pelletisation) | | | | | | | |
| MI5 (g/10 min) | 0.35 | 0.27 | 0.17 | 0.15 | 0.2 | 0.22 | 0.25 |
| HLMI (g/10 min) | 12 | 8.7 | 6 | 3.8 | 7.1 | 8.1 | 8.4 |
| HLMI/MI5 | 34.3 | 32.2 | 35.3 | 25.3 | 35.5 | 36.8 | 33.6 |
| Density (kg/m³) | 952.8 | 950 | 949 | 951 | 950.4 | 951.7 | 947 |
| G'(G" = 3000 Pa) | 1623 | 1631 | 1580 | 2335 | 1781 | 1712 | |
| η*$_{100}$ (Pa · s) | 2180 | 2221 | 2730 | 2971 | 2345 | 2322 | |
| Mn (kDa) | 8.4 | 8.5 | 9.7 | | 11.7 | 7.8 | 7.5 |
| Mw (kDa) | 268 | 292 | 326 | | 282 | 281 | 335 |
| Mz (kDa) | 1525 | 1615 | 1783 | | 1241 | 1517 | |
| Mw/Mn | 31.9 | 34.4 | 33.6 | | 24.1 | 36.0 | 44.7 |
| Mz/Mw | 5.7 | 5.5 | 5.5 | | 4.4 | 5.4 | |
| Mz/G'(G" = 3000 | 940 | 990 | 1128 | | 697 | 886 | |

* MI2'(A) was measured according to ISO1133 but with an 8 mm length/1.0 mm internal diameter die instead of the standard 8 mm/2.095 mm die, since it gives lower values which are easier to measure. MI2 (A) was calculated using the relationship MI2 (A) = 16 MI2' (A).

The relationship between Mz/G' (G"=3000 Pa) and HLMI is shown in FIG. 1 and illustrates the superior combination of high Mz/G'(improved mechanical properties) and relatively high HLMI (improved extrudability) of the inventive examples. It should also be noted that the Examples of the invention have lower values for the complex viscosity at high shear rate of 100 rad/s as measured in a dynamic rheometer ($\eta^*_{100}$) than any of the comparative Examples.

Samples of the films made from above examples were conditioned for 48 hours at 20-25° C. before measuring their dart drop impacting and Elemendorf tear resistance.

A summary of the film properties is given in Table 3 and FIG. 2, which demonstrates the improved balance of impact and TD tear resistance of the present invention. The straight line represents the equation $T_{TD}>62000/I$. Comparative example C7 exhibits a similar improved balance of properties, but this is achieved at a density which is lower than that required by the present invention, resulting in resins with lower crystallinity which would therefore be expected to have poorer barrier and tensile properties.

TABLE 3

| | | \multicolumn{7}{c|}{Film properties} |
|---|---|---|---|---|---|---|---|---|
| Example | | 1 | 2 | C3* | C4 | C5 | C6 | C7 |
| Blowing: Blow Up Ratio = 4:1 - Neck Height = 5 × D - Film thickness = 15 μm | | | | | | | | |
| Impact I (g) | g | | | | 193 | | 148 | |
| E'dorf Tear MD $T_{MD}$ | g/25 μm | | | | 16 | | 14 | |
| E'dorf Tear TD $T_{TD}$ | g/25 μm | | | | 390 | | 154 | |
| Tear ratio (=TD/MD) | — | | | | 24.4 | | 11 | |
| Blowing: Blow Up Ratio = 4:1 - Neck Height = 7 × D - Film thickness = 15 μm | | | | | | | | |
| Impact I (g) | g | 371 | 400 | | | 239 | 600 | |
| E'dorf Tear MD $T_{MD}$ | g/25 μm | 26 | 21.6 | | | 23 | 45 | |
| E'dorf Tear TD $T_{TD}$ | g/25 μm | 201 | 257 | | | 76 | 87 | |
| Tear ratio (=TD/MD) | — | 7.7 | 11.9 | | | 3.3 | 1.9 | |
| Blowing: Blow Up Ratio = 4:1 - Neck Height = 8 × D - Film thickness = 15 μm | | | | | | | | |
| Impact I (g) | g | | | | | | | 380 |
| E'dorf Tear MD $T_{MD}$ | g/25 μm | | | | | | | 20 |
| E'dorf Tear TD $T_{TD}$ | g/25 μm | | | | | | | 250 |
| Tear ratio (=TD/MD) | — | | | | | | | 12.5 |
| Blowing: Blow Up Ratio = 5:1 - Neck Height = 5 × D - Film thickness = 15 μm | | | | | | | | |
| Impact I (g) | g | | | | | 145 | 172 | |
| E'dorf Tear MD $T_{MD}$ | g/25 μm | | | | | 14 | 18 | |
| E'dorf Tear TD $T_{TD}$ | g/25 μm | | | | | 229 | 322 | |
| Tear ratio (=TD/MD) | — | | | | | 16.4 | 17.9 | |
| Blowing: Blow Up Ratio = 5:1 - Neck Height = 8 × D - Film thickness = 15 μm | | | | | | | | |
| Impact I (g) | g | | | | | 268 | 231 | 419 |
| E'dorf Tear MD $T_{MD}$ | g/25 μm | | | | | 115 | 30 | 22 |
| E'dorf Tear TD $T_{TD}$ | g/25 μm | | | | | 50 | 78 | 83 |
| Tear ratio (=TD/MD) | — | | | | | 0.43 | 2.6 | 3.8 |

E'dorf = Elmendorf
*not possible to obtain good quality of film with C3

The invention claimed is:

1. Film formed from a polyethylene composition having a density of 948-956 kg/m³, a high load melt index HLMI of 7-15, a melt storage modulus G' at a dynamic frequency where the loss modulus G"=3000 Pa, G'(G"=3000) of 1400-1800 Pa, and a value of Mz/G'(G"=3000) of at least 900 Da/Pa, where Mz is z-average molecular weight.

2. Film according to claim 1, which has a relationship between transverse direction tear strength of a 15 μm film ($T_{TD}$ in g/25 μm) and dart drop impact resistance of a 15 μm film (I in g) represented by $T_{TD}$>62000/I.

3. Film formed from a polyethylene composition having a density of 948-956 kg/m³, an HLMI of 7-15 and a melt storage modulus G' at a dynamic frequency where the loss modulus G"=3000 Pa, G'(G"=3000) of 1400-1800 Pa, said film having a relationship between transverse direction tear strength of a 15 μm film ($T_{TD}$, expressed in g/25 μm) and dart drop impact resistance of a 15 μm film (I, expressed in g) represented by $T_{TD}$>62000/I.

4. Film according to claim 3, wherein the polyethylene composition has a value of Mz/G'(G"=3000) of at least 900 Da/Pa, where Mz is z-average molecular weight.

5. Film according to claim 1, wherein the polyethylene composition has a melt storage modulus G'(G"=3000) of from 1450 to 1750 Pa.

6. Film according to claim 1, wherein the polyethylene composition has a melt storage modulus G'(G"=3000) of from 1500 to 1700 Pa.

7. Film according to claim 1, wherein the polyethylene composition has a value of Mz/G'(G"=3000) of at least 920 Da/Pa, where Mz is z-average molecular weight.

8. Film according to claim 1, wherein the polyethylene composition has a value of Mz/G'(G"=3000) of at least 930 Da/Pa, where Mz is z-average molecular weight.

9. Film according to claim 1, wherein the polyethylene composition has a dynamic complex viscosity η*100 below 2400 Pa·s.

10. Film according to claim 1, wherein the polyethylene composition has a dynamic complex viscosity η*100 below 2300 Pa·s.

11. Film according to claim 1, wherein the polyethylene composition has a melt flow index $MI_5$ of between 0.2 g/10 min and 0.5 g/10 min.

12. Film according to claim 1, wherein the polyethylene composition has a density of from 949 to 955 kg/m³.

13. Film according to claim 1, wherein the polyethylene composition is a multimodal composition comprising from 47 to 55 wt % of an ethylene polymer (A) having a density of at least 965 kg/m³, and from 45 to 53 wt % of an ethylene polymer (B) having a density of 910 to 945 kg/m³.

14. Film according to claim 1, which has a dart drop value of more than 270, when the film has a thickness of 15 μm and is extruded with a die diameter of 100 mm, a die gap of 1.2 mm, a blow-up ratio BUR of 4, a neck height of 7× die diameter and a take-up speed of 30 m/min.

15. Film according to claim 1, which has a dart drop value of more than 310, when the film has a thickness of 15 μm and is extruded with a die diameter of 100 mm, a die gap of 1.2 mm, a blow-up ratio BUR of 4, a neck height of 7× die diameter and a take-up speed of 30 m/min.

16. Film according to claim 1, which has an Elmendorf tear strength in the transverse direction (TD) of at least 150 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

17. Film according to claim 1, which has an Elmendorf tear strength in the transverse direction (TD) of at least 170 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

18. Film according to claim 1, which has an Elmendorf tear strength in the machine direction (MD) of at least 18 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

19. Film according to claim 1, which has an Elmendorf tear strength in the machine direction (MD) of at least 20 g/25 μm, when the film has a thickness of 15 μm and is extruded with a die diameter of 100 mm, a die gap of 1.2 mm, a blow-up ratio BUR of 4, a neck height of 7× die diameter and a take-up speed of 30 m/min.

\* \* \* \* \*